United States Patent
Yoshikawa et al.

(10) Patent No.: US 11,378,182 B2
(45) Date of Patent: Jul. 5, 2022

(54) VEHICLE CONTROLLER AND METHOD OF CONTROLLING VEHICLE

(71) Applicant: TOYOTA JIDOSHA KABUSHIKI KAISHA, Toyota (JP)

(72) Inventors: Hayato Yoshikawa, Toyota (JP); Junichi Inoue, Toyota (JP); Tatsuya Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/168,586

(22) Filed: Feb. 5, 2021

(65) Prior Publication Data

US 2021/0246980 A1   Aug. 12, 2021

(30) Foreign Application Priority Data

Feb. 7, 2020   (JP) .............................. JP2020-019420

(51) Int. Cl.
*F16H 61/16*   (2006.01)
*B60Q 9/00*    (2006.01)
*B60Q 5/00*    (2006.01)

(52) U.S. Cl.
CPC ............. *F16H 61/16* (2013.01); *B60Q 5/005* (2013.01); *B60Q 9/00* (2013.01);
(Continued)

(58) Field of Classification Search
CPC ............... F16H 61/16; F16H 2061/161; F16H 2061/163; F16H 2061/166; B60Q 5/005; B60Q 9/00; B60W 10/06; B60W 10/10; B60W 30/19; B60W 30/192; B60W 30/194

See application file for complete search history.

(56) References Cited

U.S. PATENT DOCUMENTS

2003/0158645 A1*  8/2003  Czarnecki ..............  B60K 31/04
                                                        701/55
2005/0171669 A1*  8/2005  Sato ....................  B60W 30/188
                                                        701/51

(Continued)

FOREIGN PATENT DOCUMENTS

JP   H07-096779 A   4/1995
JP   2000220500 A   8/2000

(Continued)

*Primary Examiner* — Edwin A Young
(74) *Attorney, Agent, or Firm* — Hunton Andrews Kurth LLP

(57) ABSTRACT

A vehicle controller controls a vehicle including an engine and an automatic transmission. The vehicle controller includes an electronic control unit. The electronic control unit estimates power generable by the engine based on a condition of the engine and a condition of the automatic transmission in a non-driving range, calculates a load on the automatic transmission in a driving range based on a condition of the automatic transmission in the driving range, determines whether a difference between the power and the load is equal to or smaller than a predetermined threshold by which an engine stall is identifiable, and limits a gear shift request from the non-driving range to the driving range when the difference is equal to or smaller than the predetermined threshold.

7 Claims, 5 Drawing Sheets

(52) U.S. Cl.
CPC .. *F16H 2061/161* (2013.01); *F16H 2061/163* (2013.01); *F16H 2061/166* (2013.01)

(56) References Cited

U.S. PATENT DOCUMENTS

| | | | | |
|---|---|---|---|---|
| 2011/0077829 | A1* | 3/2011 | Morselli | F16H 61/16 |
| | | | | 701/61 |
| 2016/0046278 | A1* | 2/2016 | Matsuzaki | B60W 10/08 |
| | | | | 903/930 |

FOREIGN PATENT DOCUMENTS

| | | |
|---|---|---|
| JP | 2004060803 A | 2/2004 |
| JP | 2019039488 A | 3/2019 |

* cited by examiner

FIG. 2A

| COOLANT TEMPERATURE | OIL TEMPERATURE | NUMBER OF OUTPUT REVOLUTIONS | | | |
|---|---|---|---|---|---|
| | | Ne_1 | Ne_2 | ... | Ne_6 |
| Tw_1 | To_1 | Te_111 | Te_211 | ... | Te_611 |
| | To_2 | Te_112 | Te_212 | ... | Te_612 |
| | : | : | : | : | : |
| | To_n | Te_11n | Te_21n | ... | Te_61n |
| Tw_2 | To_1 | Te_121 | Te_221 | ... | Te_621 |
| | To_2 | Te_122 | Te_222 | ... | Te_622 |
| | : | : | : | : | : |
| | To_n | Te_12n | Te_22n | ... | Te_62n |
| : | : | : | : | : | : |
| Tw_n | To_1 | Te_1n1 | Te_2n1 | ... | Te_6n1 |
| | To_2 | Te_1n2 | Te_2n2 | ... | Te_6n2 |
| | : | : | : | : | : |
| | To_n | Te_1nn | Te_2nn | ... | Te_6nn |

} ENGINE TORQUE

\* ENGINE POWER X = ENGINE TORQUE × NUMBER OF OUTPUT REVOLUTIONS × ATMOSPHERIC PRESSURE COEFFICIENT

FIG. 2B

| ATMOSPHERIC PRESSURE | ATMOSPHERIC PRESSURE COEFFICIENT |
|---|---|
| 1000-900 | 1.00 |
| 900-800 | 0.95 |
| 800-700 | 0.83 |
| 700-600 | 0.61 |

FIG. 3A

| P RANGE | | | | |
|---|---|---|---|---|
| ⧄ | \multicolumn{4}{c}{NUMBER OF INPUT REVOLUTIONS} |
| OIL TEMPERATURE | Nf_1 | Nf_2 | ... | Nf_6 |
| Tq_1 | Tlp_11 | Tlp_21 | ... | Tlp_61 |
| Tq_2 | Tlp_12 | Tlp_22 | ... | Tlp_62 |
| : | : | : | : | : |
| Tq_n | Tlp_1n | Tlp_2n | ... | Tlp_6n |

P-RANGE LOAD TORQUE

\* P-RANGE LOAD Y1 = P-RANGE LOAD TORQUE × NUMBER OF INPUT REVOLUTIONS

FIG. 3B

| D RANGE | | | | |
|---|---|---|---|---|
| ⧄ | \multicolumn{4}{c}{NUMBER OF INPUT REVOLUTIONS} |
| OIL TEMPERATURE | Nf_1 | Nf_2 | ... | Nf_6 |
| Tq_1 | Tld_11 | Tld_21 | ... | Tld_61 |
| Tq_2 | Tld_12 | Tld_22 | ... | Tld_62 |
| : | : | : | : | : |
| Tq_n | Tld_1n | Tld_2n | ... | Tld_6n |

D-RANGE LOAD TORQUE

\* D-RANGE LOAD Y2 = D-RANGE LOAD TORQUE × NUMBER OF INPUT REVOLUTIONS

VEHICLE CONTROLLER AND METHOD OF CONTROLLING VEHICLE

CROSS-REFERENCE TO RELATED APPLICATION

This application claims priority to Japanese Patent Application No. 2020-019420 filed on Feb. 7, 2020, incorporated herein by reference in its entirety.

BACKGROUND

1. Technical Field

The present disclosure relates to a vehicle controller and a method of controlling vehicle.

2. Description of Related Art

There is known a vehicle controller configured to control a vehicle including an engine and an automatic transmission. In particular, there are known various technologies related to automatic transmissions (see Japanese Unexamined Patent Application Publication Nos. 2019-39488 (JP 2019-39488 A), 7-96779 (JP 7-96779 A), and 2000-220500 (JP 2000-220500 A)). For example, the following technology is proposed. When a driver makes an operation to request switching from a parking range to a drive range but an engine load is equal to or larger than a predetermined value, switching to any traveling range is prohibited (see Japanese Unexamined Patent Application Publication No. 2004-60803 (JP 2004-60803 A)). In the following description, the parking range is referred to as "P range", and the drive range is referred to as "D range".

SUMMARY

The engine may stall when a shift lever is operated from a non-driving range such as the P range to a driving range such as the D range in a predetermined environment such as a low air temperature. For example, when the air temperature is low, the viscosity of lubricating oil flowing through the engine increases, and a load that depends on the increased viscosity of the lubricating oil acts on power of the engine.

When the air temperature is low, the viscosity of hydraulic oil flowing through the automatic transmission increases as well. Thus, when the shift lever is operated from the non-driving range to the driving range, a load caused along with the operation for the shift lever is added to, for example, a load that depends on the viscosity of the hydraulic oil in the non-driving range. The resultant load acts on the power of the engine.

That is, the two loads on the engine and on the automatic transmission act on the power of the engine. When the power of the engine does not exceed the sum of the two loads, the engine stalls.

The present disclosure has an object to suppress an engine stall when a shift change operation is performed from a non-driving range to a driving range at least in a low-temperature environment.

A first aspect of the disclosure relates to a vehicle controller that controls a vehicle including an engine and an automatic transmission, the vehicle controller including an electronic control unit, the electronic control unit being configured to: estimate power generable by the engine based on a condition of the engine and a condition of the automatic transmission in a non-driving range; calculate a load on the automatic transmission in a driving range based on a condition of the automatic transmission in the driving range; determine whether a difference between the power and the load is equal to or smaller than a predetermined threshold by which an engine stall is identifiable; and restrict a gear shift request from the non-driving range to the driving range when the difference is equal to or smaller than the predetermined threshold.

In the above aspect, the electronic control unit may be configured to correct the power based on an atmospheric pressure.

In the above aspect, the electronic control unit may be configured to estimate the power based also on a load caused by an auxiliary device of the engine.

In the above aspect, the electronic control unit may be configured to, when the difference is equal to or smaller than the predetermined threshold, estimate a time required for the difference to exceed the predetermined threshold based on a change in the condition of the engine, and cause an indicator to show a graphical object that changes at least one of a shape, a pattern, and a color of the graphical object depending on an elapse of the estimated time.

In the above aspect, the electronic control unit may be configured to, when the difference is equal to or smaller than the predetermined threshold, cause a loudspeaker to output a sound indicating that a shift change operation from the non-driving range to the driving range is restricted.

In the above aspect, the electronic control unit may be configured to halt the gear shift request when the difference is equal to or smaller than the predetermined threshold.

A second aspect of the disclosure relates to a method of controlling a vehicle including an engine and an automatic transmission, the method including: estimating power generable by the engine based on a condition of the engine and a condition of the automatic transmission in a non-driving range; calculating a load on the automatic transmission in a driving range based on a condition of the automatic transmission in the driving range; determining whether a difference between the power and the load is equal to or smaller than a predetermined threshold by which an engine stall is identifiable; and restricting a gear shift request from the non-driving range to the driving range when the difference is equal to or smaller than the predetermined threshold.

According to the present disclosure, it is possible to suppress the engine stall when the shift change operation is performed from the non-driving range to the driving range at least in the low-temperature environment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A illustrates an example of an engine torque map;

FIG. 2B illustrates an example of an atmospheric pressure map;

FIG. 3A illustrates a load torque map for an automatic transmission in a P range;

FIG. 3B illustrates a load torque map for the automatic transmission in a D range;

DETAILED DESCRIPTION OF EMBODIMENTS

An embodiment of the present disclosure is described below with reference to the drawings.

Figure 1:
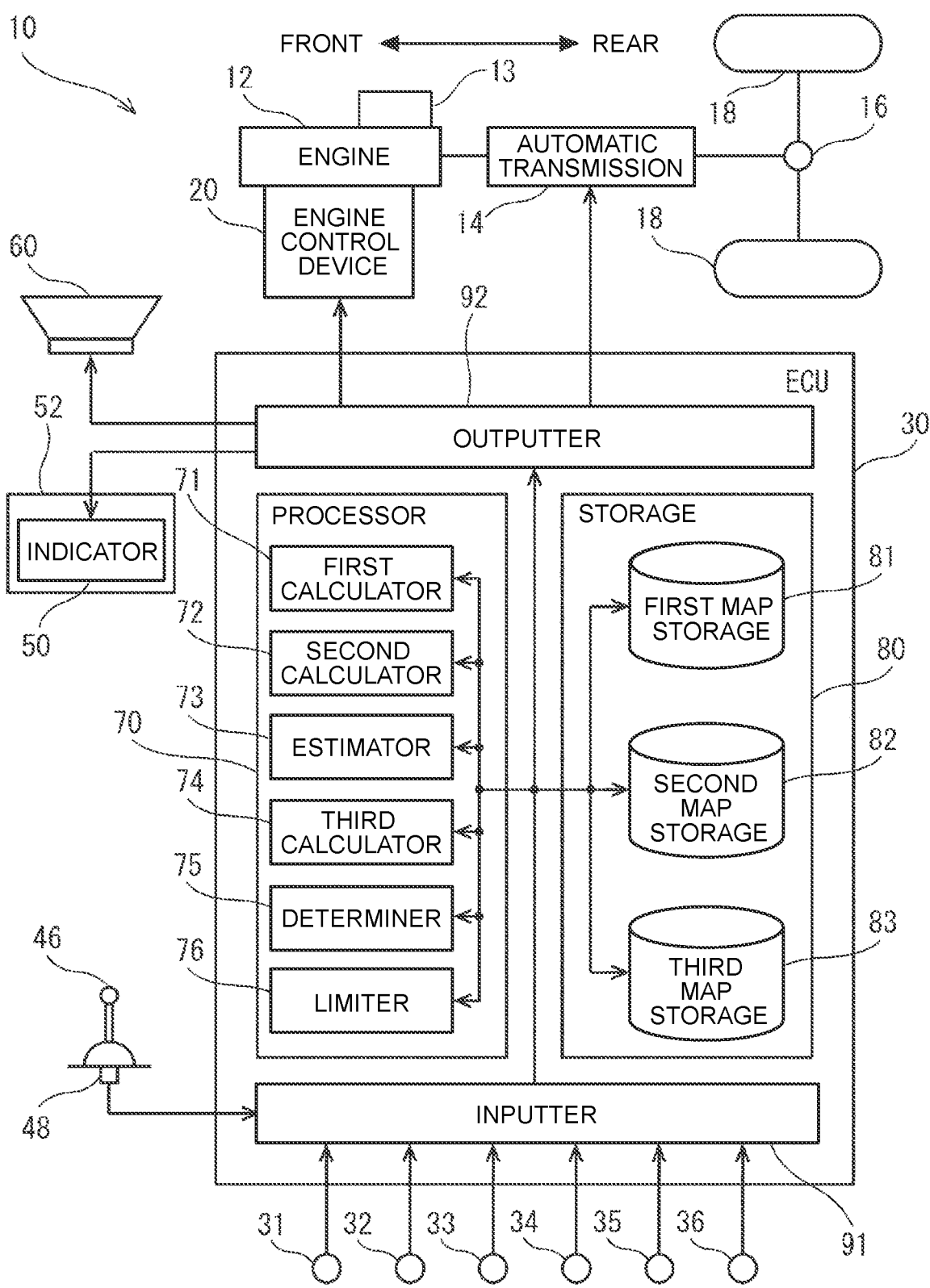
FIG. 1 is a block diagram illustrating the overall configurations of a drive system and a control system of a vehicle.

As illustrated in FIG. 1, a vehicle 10 includes an engine 12, an automatic transmission 14, a final speed reducer 16, and right and left driving wheels 18. The engine 12 is a power source of the vehicle 10. The engine 12 is an internal combustion engine such as a gasoline engine or a diesel engine. The engine 12 may be a hybrid engine including an electric motor. The vehicle 10 also includes an auxiliary device 13 provided in association with the engine 12. Examples of the auxiliary device 13 include a starter, a self-starter, an alternator, a water pump, and a compressor of an air conditioner.

The engine 12 includes an oil gallery and a water jacket. Lubricating oil to be used for lubricating the engine 12 flows through the oil gallery. Water to be used for cooling the engine 12 (that is, a coolant) flows through the water jacket. In this embodiment, the temperature of at least one of the lubricating oil and the water can be employed as a condition of the engine 12. An estimated temperature of the engine 12 may be employed as the condition of the engine 12. The estimated temperature can be estimated based on the temperature of at least one of the lubricating oil and the water. A refrigerant including an antifreeze may be employed in place of the water.

An engine control device 20 controls the engine 12. The engine control device 20 includes an injector, a spark plug, and an electronic throttle valve. The injector supplies fuel. The spark plug ignites an air-fuel mixture containing the fuel and fresh air. The electronic throttle valve is opened or closed in response to an operation for an accelerator pedal to adjust an intake amount of the fresh air. The fuel may be gasoline or light oil. If the engine 12 has an electric motor, the engine control device 20 includes an inverter. In this case, the electric motor is supplied with electric power from a power storage device such as a battery, or from a fuel cell using hydrogen and the like.

The automatic transmission 14 includes a torque converter and a clutch mechanism. The torque converter increases or reduces an engine torque by using hydraulic oil (specifically, an automatic transmission fluid (ATF)). The clutch mechanism is engaged or disengaged depending on a hydraulic pressure of the hydraulic oil. The automatic transmission 14 further includes a planetary-gearing type stepped transmission. The hydraulic oil also lubricates various components (gears and the like) of the automatic transmission 14. In this embodiment, a temperature of the hydraulic oil in the engaged state can be employed as a condition of the automatic transmission 14 in a driving range, and a temperature of the hydraulic oil in the disengaged state can be employed as a condition of the automatic transmission 14 in a non-driving range. The driving range is a range in which the automatic transmission 14 transmits driving power from the power source of the vehicle 10 to the final speed reducer 16 and the right and left driving wheels 18. The non-driving range is a range in which the automatic transmission 14 does not transmit driving power from the power source of the vehicle 10 to the final speed reducer 16 or the right and left driving wheels 18. An estimated temperature of the automatic transmission 14 may be employed as the condition of the automatic transmission 14 in the driving range or the non-driving range. The estimated temperature can be estimated based on the temperature of the hydraulic oil. A belt type mechanical continuously variable transmission or an electric continuously variable transmission having a differential mechanism may be employed in place of the stepped transmission. By engaging the clutch mechanism, a drive state and a reverse state can be achieved. In the drive state, the vehicle can travel forward. In the reverse state, the vehicle can travel rearward. By disengaging the clutch mechanism, a parked state and a neutral state can be achieved. In the parked state and the neutral state, transmission of power of the engine 12 to the automatic transmission 14 is interrupted.

The parked state and the neutral state differ from each other in the following points. In the parked state, an output shaft of the automatic transmission 14 is mechanically fixed by a parking mechanism. In the neutral state, the output shaft of the automatic transmission 14 is not mechanically fixed by the parking mechanism. Examples of the parking mechanism include a parking lock gear (or a parking gear) and a parking pawl. By mechanically fixing the output shaft of the automatic transmission 14 by the parking mechanism, the vehicle 10 can be stopped in the parked state.

The vehicle 10 includes an electronic control unit (ECU) 30. The ECU 30 is a vehicle controller configured to perform various types of control including power control for the engine 12 using the engine control device 20, and gear shift control for the automatic transmission 14. The ECU 30 includes a microcomputer. The microcomputer includes a central processing unit (CPU), a random access memory (RAM), a read only memory (ROM), and an input/output interface (specifically, an input/output circuit). The ECU 30 implements various functions described later and executes various types of signal processing described later based on programs prestored in the ROM while using a temporary storage function of the RAM. The programs may be based on a flowchart described later.

A lever position sensor 48 configured to detect a lever operation position Psh of a shift lever 46 supplies a signal indicating the lever operation position Psh to the ECU 30. An atmospheric pressure sensor 31 supplies a signal indicating an atmospheric pressure Ta to the ECU 30. A coolant temperature sensor 32 supplies a signal indicating a coolant temperature Tw to the ECU 30. An engine oil temperature sensor 33 supplies a signal indicating an oil temperature To of the lubricating oil of the engine 12 to the ECU 30. An automatic-transmission (AT) oil temperature sensor 34 supplies a signal indicating an oil temperature Tq of the hydraulic oil of the automatic transmission 14 to the ECU 30. An engine output rotation sensor 35 supplies a signal indicating the number of output revolutions Ne of the engine 12 to the ECU 30. The number of output revolutions may be regarded as an output rotation speed. An AT input rotation sensor 36 supplies a signal indicating the number of input revolutions Nf of the automatic transmission 14 to the ECU 30. The number of input revolutions may be regarded as an input rotation speed.

The coolant temperature sensor 32, the engine oil temperature sensor 33, and the engine output rotation sensor 35 are provided on the engine 12. The AT oil temperature sensor 34 and the AT input rotation sensor 36 are provided on the automatic transmission 14. The atmospheric pressure sensor 31 may be provided on the engine 12, on the automatic transmission 14, or at any position in the vehicle 10 other than the engine 12 and the automatic transmission 14. An intake pressure sensor configured to supply a signal indicating a pressure of fresh air may be used in place of the atmospheric pressure sensor 31, and the atmospheric pressure Ta may be estimated based on the signal.

For example, the shift lever 46 is provided near a driver's seat. The shift lever 46 can manually be operated to any operation position that is at least a D position, an R position, a P position, or an N position. By shifting to the D position, a D range for forward traveling can be selected. In the D range, the automatic transmission 14 is in the drive state. By shifting to the R position, a reverse range (that is, an R range) for rearward traveling can be selected. In the R range, the automatic transmission 14 is in the reverse state. In this embodiment, the D range and the R range can be employed as the driving ranges. By shifting to the N position, an N range can be selected. In the N range, the automatic transmission 14 is in the neutral state. By shifting to the P position, a P range can be selected. In the P range, the automatic transmission 14 is in the parked state. In this embodiment, the N range and the P range can be employed as the non-driving ranges.

An indicator 50 is connected to the ECU 30. The indicator 50 is arranged on an instrument panel 52 near the driver's seat. Examples of the indicator 50 include a vacuum fluorescent display (VFD) panel and a liquid crystal display panel. When a first indication signal is received from the ECU 30, the indicator 50 shows a vehicle speed, a remaining fuel amount, the number of revolutions (or the rotation speed) of the engine 12, and the like. Although details are described later, when there is a possibility that the engine stalls in response to an operation for the shift lever 46 from the non-driving range to the driving range, the indicator 50 shows a graphical object that depends on a waiting time to avoid the engine stall based on a second indication signal received from the ECU 30. Specifically, the indicator 50 shows a graphical object that changes its form depending on an elapse of the waiting time.

A loudspeaker 60 is connected to the ECU 30. For example, the loudspeaker 60 is arranged near a front door of the vehicle 10, a ceiling of a vehicle cabin, or the driver's seat. When a first output signal corresponding to an instruction to output an alert sound is received from the ECU 30, the loudspeaker outputs an alert sound (for example, a beeping sound) based on the received output signal. Examples of the alert sound include a sound for notifying a driver that a seatbelt is not fastened or a door is not closed completely. Although details are described later, when there is a possibility that the engine stalls in response to an operation for the shift lever 46 from the non-driving range to the driving range, the loudspeaker 60 outputs a rejection sound based on a second output signal received from the ECU 30. The rejection sound notifies the driver that the ECU 30 restricts a gear shift request from the non-driving range to the driving range. The rejection sound may be identical to or different from the alert sound. To securely notify the driver that the ECU 30 discards the gear shift request, the rejection sound is desirably different from the alert sound.

The ECU 30 controls the power of the engine 12 via the engine control device 20 depending on an accelerator operation amount or the like. The ECU 30 shifts the gears of the automatic transmission 14 based on a predetermined gear shift map (not illustrated). The ECU 30 functionally includes a processor 70, a storage 80, an inputter 91, and an outputter 92. The processor 70 can be implemented by the CPU. The storage 80 can be implemented by either or both of the RAM and the ROM. The inputter 91 and the outputter 92 can be implemented by the input/output interface.

The processor 70 includes a first calculator 71, a second calculator 72, and an estimator 73 as components. The processor 70 includes a third calculator 74, a determiner 75, and a limiter 76 as components. The storage 80 includes a first map storage 81, a second map storage 82, and a third map storage 83 as components.

The first map storage 81 stores an engine torque map. As illustrated in FIG. 2A, in the engine torque map, combinations of the coolant temperature of the engine 12, the oil temperature of the lubricating oil of the engine 12, and the number of output revolutions of the engine 12 are associated with engine torques. For example, a combination of a coolant temperature "Tw_1 (° C.)", an oil temperature "To_1 (° C.)", and the number of output revolutions "Ne_1 (rpm)" is associated with an engine torque "Te_111 (N·m)". That is, when the coolant temperature, the oil temperature of the lubricating oil, and the number of output revolutions are determined, the engine torque can be determined in association with the combination of the coolant temperature, the oil temperature, and the number of output revolutions. For example, when a coolant temperature "−30 (° C.)", an oil temperature "−30 (° C.)", and the number of output revolutions "1000 (rpm)" can be determined, the engine torque can be determined in association with the combination of the determined values.

The engine torque illustrated in FIG. 2A is a difference between an output torque of the engine 12 and a load torque of the engine 12 that depends on the viscosity of the lubricating oil. That is, the engine torque is a torque generable by the engine 12. The oil temperature of the lubricating oil is correlated to the viscosity. Therefore, when the oil temperature of the lubricating oil can be determined, the load torque of the engine 12 can be determined depending on the viscosity of the lubricating oil. The engine torque can be measured by using a torque sensor provided on an unmounted engine that is the engine 12 before being mounted on the vehicle 10. When combinations of the coolant temperature, the oil temperature, and the number of output revolutions of the unmounted engine are measured and engine torques associated with the combinations are measured, it is possible to create an engine torque map in which the combinations of the coolant temperature, the oil temperature, and the number of output revolutions are associated with the engine torques. The engine torque map may be created in advance by using the unmounted engine, or may be created during driving of the engine 12 by providing the torque sensor on the engine 12. Some engine torques may be measured and the other engine torques may be estimated based on the measured engine torques and a predetermined calculation expression.

The first map storage 81 stores an atmospheric pressure map. As illustrated in FIG. 2B, in the atmospheric pressure map, ranges of the atmospheric pressure are associated with atmospheric pressure coefficients. For example, an atmospheric pressure "1000 to 900 (hPa)" is associated with an atmospheric pressure coefficient "1.00". The correspondence between the atmospheric pressure and the atmospheric pressure coefficient is an example, and is not particularly limited to this example. As the atmospheric pressure decreases, the power of the engine tends to decrease. Therefore, an atmospheric pressure coefficient that decreases along with the decrease in the atmospheric pressure is employed. Thus, even in a case of an upland as high as, for example, 3000 m, an atmospheric pressure unique to the upland can be taken into consideration. Although details are described later, engine power X of the engine 12 can be calculated by multiplying at least the engine torque and the number of output revolutions together. The engine power X of the engine 12 may be calculated by multiplying the engine torque, the number of output revolutions, and the atmospheric pressure coefficient together. Thus, the accuracy of the engine power X of the engine 12 can be improved.

The second map storage 82 stores a load torque map for the automatic transmission 14 in the P range (hereinafter referred to as "P-range load torque map"). As illustrated in FIG. 3A, in the P-range load torque map, combinations of the oil temperature of the hydraulic oil of the automatic transmission 14 in the P range and the number of input revolutions of the automatic transmission 14 in the P range are associated with load torques. For example, a combination of an oil temperature "Tq_1 (° C.)" and the number of input revolutions "Nf_1 (rpm)" is associated with a load torque "Tlp_11 (N·m)". That is, when the oil temperature of the hydraulic oil and the number of input revolutions of the automatic transmission 14 can be determined, the load torque in the P range can be determined in association with the combination of the oil temperature and the number of input revolutions.

The load torque illustrated in FIG. 3A is a torque of the automatic transmission 14 in the P range that depends on the viscosity of the hydraulic oil. The oil temperature of the hydraulic oil is correlated to the viscosity. Therefore, when the oil temperature of the hydraulic oil can be determined, the load torque of the automatic transmission 14 in the P range can be determined depending on the viscosity of the hydraulic oil. The second map storage 82 may store a load torque map for the automatic transmission 14 in the N range similarly to the P-range load torque map. Although details are described later, a P-range load Y1 on the automatic transmission 14 in the P range can be calculated by multiplying the load torque and the number of input revolutions in the P range together.

The third map storage 83 stores a load torque map for the automatic transmission 14 in the D range (hereinafter referred to as "D-range load torque map"). As illustrated in FIG. 3B, in the D-range load torque map, combinations of the oil temperature of the hydraulic oil of the automatic transmission 14 and the number of input revolutions of the automatic transmission 14 are associated with load torques. For example, a combination of the oil temperature "Tq_1 (° C.)" and the number of input revolutions "Nf_1 (rpm)" is associated with a load torque "Tld_11 (N·m)". That is, when the oil temperature of the hydraulic oil and the number of input revolutions of the automatic transmission 14 can be determined, the load torque in the D range can be determined in association with the combination of the oil temperature and the number of input revolutions.

The load torque illustrated in FIG. 3B is a torque of the automatic transmission 14 in the D range along with an operation for the shift lever. For example, when the D range is selected and the power of the engine 12 is transmitted to the automatic transmission 14, a great force is required to rotate the gears at a low oil temperature and a high viscosity of the hydraulic oil. Therefore, the load torque increases. Thus, the oil temperature of the hydraulic oil is correlated to the viscosity, and the load torque of the automatic transmission 14 in the D range along with an operation for the shift lever can be determined. The third map storage 83 may store a load torque map for the automatic transmission 14 in the R range similarly to the D-range load torque map. Although details are described later, a D-range load Y2 on the automatic transmission 14 in the D range can be calculated by multiplying the load torque and the number of input revolutions in the D range together.

The load torque can be measured by using a torque sensor provided on an unmounted automatic transmission that is the automatic transmission 14 before being mounted on the vehicle 10. When combinations of the oil temperature and the number of input revolutions of the unmounted automatic transmission are measured and load torques associated with the combinations are measured, it is possible to create a P-range load torque map in which the combinations of the oil temperature and the number of input revolutions are associated with the load torques. The same applies to the D-range load torque map as in the case of the P-range load torque map. The P-range load torque map and the D-range load torque map can be created in advance by using the unmounted automatic transmission. Some load torques may be measured and the other load torques may be estimated based on the measured load torques and a predetermined calculation expression.

The components of the processor 70 execute various processes by accessing the components of the storage 80. For example, the first calculator 71 calculates the engine power X of the engine 12 based on the number of output revolutions of the engine 12, the coolant temperature of the water flowing through the engine 12, the oil temperature of the lubricating oil flowing through the engine 12, and the engine torque map. As described above, the engine torque map defines the number of output revolutions, the coolant temperature, the oil temperature, and the torque of the engine 12 associated with a combination of those values. The first calculator 71 may calculate the engine power X of the engine 12 based on the atmospheric pressure coefficient as well. The other components of the processor 70 are described in detail in description of the operation of the ECU 30.

Next, the operation of the ECU 30 is described with reference to FIG. 4 and FIG. 5A to FIG. 5D.

Figure 4:
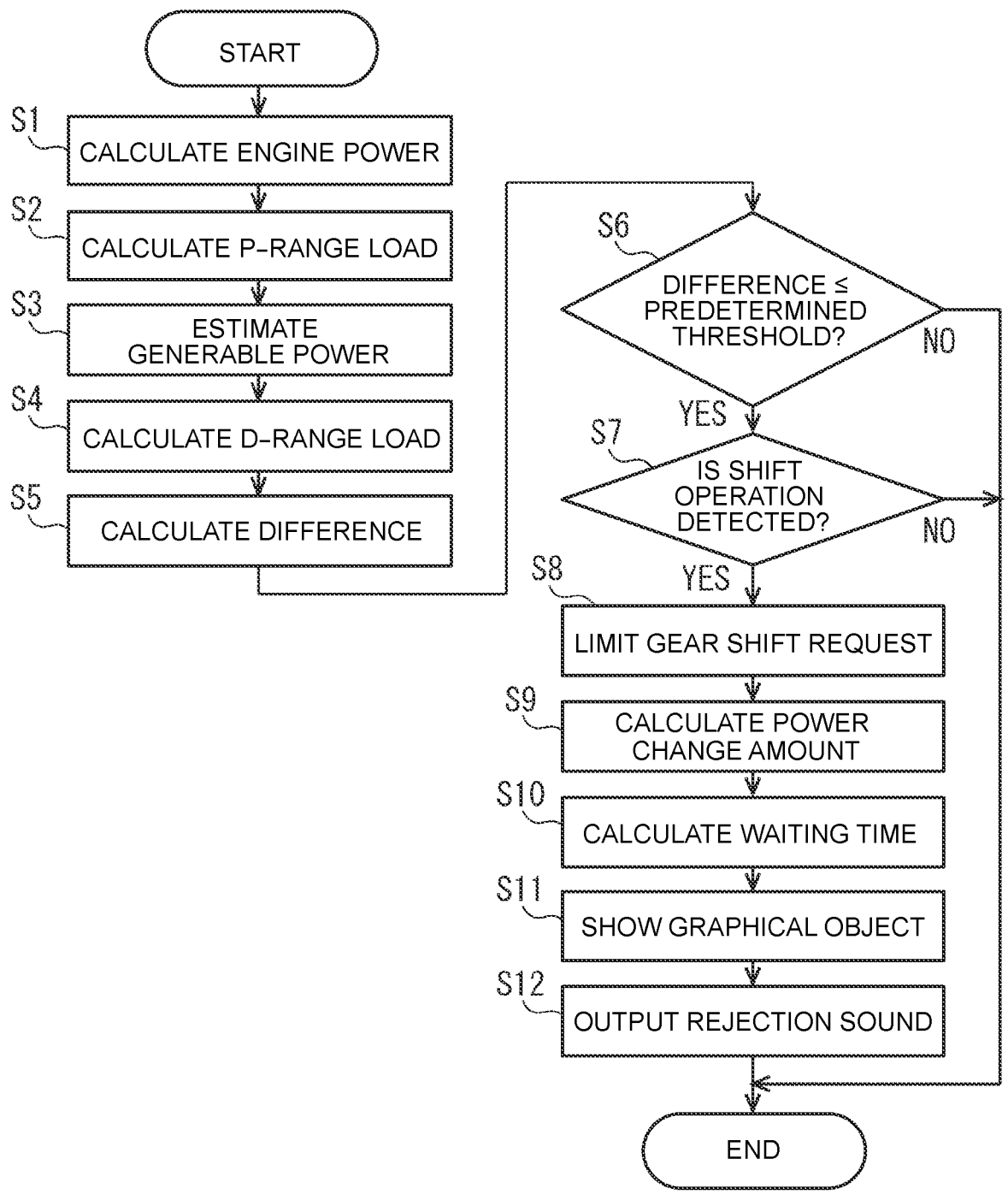
FIG. 4 is a flowchart illustrating an example of processes to be executed by an electronic control unit (ECU)

Processes in a flowchart of FIG. 4 are executed immediately after the start of the engine 12. The ECU 30 can repeatedly execute the series of processes in the flowchart of FIG. 4 periodically (for example, every few seconds or every few milliseconds). The following description is directed to the P range and the D range as an example, but the N range may be employed in place of the P range, or the R range may be employed in place of the D range.

As illustrated in FIG. 4, the first calculator 71 first calculates the engine power X of the engine 12 (Step S1). More specifically, in response to the start of the engine 12, the first calculator 71 acquires a signal indicating the atmospheric pressure Ta supplied from the atmospheric pressure sensor 31 via the inputter 91. Similarly, the first calculator 71 acquires a signal indicating the coolant temperature Tw supplied from the coolant temperature sensor 32. The first calculator 71 acquires a signal indicating the oil temperature To of the lubricating oil of the engine 12 that is supplied from the engine oil temperature sensor 33. The first calculator 71 acquires a signal indicating the number of output revolutions Ne of the engine 12 that is supplied from the engine output rotation sensor 35. The order of acquisition of the signals is not particularly limited.

When the four signals are acquired, the first calculator 71 acquires an engine torque by accessing the engine torque map (see FIG. 2A) stored in the first map storage 81. Specifically, the first calculator 71 acquires, from the engine torque map, an engine torque associated with three signals that are the signal indicating the coolant temperature Tw, the signal indicating the oil temperature To, and the signal indicating the number of output revolutions Ne. Similarly, the first calculator 71 acquires an atmospheric pressure coefficient by accessing the atmospheric pressure map (see FIG. 2B) stored in the first map storage 81. Specifically, the first calculator 71 acquires, from the atmospheric pressure map, an atmospheric pressure coefficient associated with the signal indicating the atmospheric pressure Ta. When the engine torque and the atmospheric pressure coefficient are acquired, the first calculator 71 calculates the engine power X of the engine 12 by multiplying the engine torque, the number of output revolutions Ne, and the atmospheric pressure coefficient together.

When the process of Step S1 is completed, the second calculator 72 then calculates the P-range load Y1 of the automatic transmission 14 (Step S2). More specifically, the second calculator 72 acquires a signal indicating the oil temperature Tq of the hydraulic oil of the automatic transmission 14 that is supplied from the AT oil temperature sensor 34 via the inputter 91. Similarly, the second calculator 72 acquires a signal indicating the number of input revolutions Nf of the automatic transmission 14 that is supplied from the AT input rotation sensor 36. The order of acquisition of the signals is not particularly limited.

When the two signals are acquired, the second calculator 72 acquires a P-range load torque by accessing the P-range load torque map (see FIG. 3A) stored in the second map storage 82. Specifically, the second calculator 72 acquires, from the P-range load torque map, a P-range load torque associated with the two signals that are the signal indicating the oil temperature Tq and the signal indicating the number of input revolutions Nf. When the P-range load torque is acquired, the second calculator 72 calculates the P-range load Y1 of the automatic transmission 14 by multiplying the P-range load torque and the number of input revolutions Nf together.

When the process of Step S2 is completed, the estimator 73 then estimates generable power α of the engine 12 (Step S3). More specifically, the estimator 73 estimates the generable power α of the engine 12 based on a difference between the engine power X of the engine 12 and the P-range load Y1 of the automatic transmission 14. In a state in which the P range is selected, transmission of the engine power X of the engine 12 to the automatic transmission 14 is interrupted. Through this process, power generable by the engine 12 immediately after the shift lever 46 is operated from the P range to the D range is estimated.

When the process of Step S3 is completed, the third calculator 74 then calculates the D-range load Y2 of the automatic transmission 14 (Step S4). More specifically, the third calculator 74 acquires a signal indicating the oil temperature Tq of the hydraulic oil of the automatic transmission 14 that is supplied from the AT oil temperature sensor 34 via the inputter 91. Similarly, the third calculator 74 acquires a signal indicating the number of input revolutions Nf of the automatic transmission 14 that is supplied from the AT input rotation sensor 36. The order of acquisition of the signals is not particularly limited.

When the two signals are acquired, the third calculator 74 acquires a D-range load torque by accessing the D-range load torque map (see FIG. 3B) stored in the third map storage 83. Specifically, the third calculator 74 acquires, from the D-range load torque map, a D-range load torque associated with the two signals that are the signal indicating the oil temperature Tq and the signal indicating the number of input revolutions Nf. When the D-range load torque is acquired, the third calculator 74 calculates the D-range load Y2 of the automatic transmission 14 by multiplying the D-range load torque and the number of input revolutions Nf together.

When the process of Step S4 is completed, the determiner 75 then calculates a difference between the generable power α of the engine 12 and the D-range load Y2 (Step S5), and determines whether the difference is equal to or smaller than a predetermined threshold (Step S6). A threshold by which an engine stall is identifiable can be employed as the predetermined threshold. When the difference is larger than the predetermined threshold (Step S6: NO), the limiter 76 terminates the processes by skipping subsequent processes. That is, when the difference is larger than the predetermined threshold, the determiner 75 determines that the possibility of the engine stall is low, and does not execute the subsequent processes.

When the difference is equal to or smaller than the predetermined threshold (Step S6: YES), the limiter 76 determines whether a shift operation is detected (Step S7). More specifically, the limiter 76 determines whether a garage shift operation for operating the shift lever 46 from the P range to the D range is detected. When the shift operation is not detected (Step S7: NO), the limiter 76 terminates the processes by skipping subsequent processes. That is, when the possibility of the engine stall is high but the shift operation is not detected, the limiter 76 does not execute the subsequent processes. When the garage shift operation is performed, garage shift control is performed. In the garage shift control, the clutch mechanism is smoothly engaged by supplying the clutch mechanism with a garage shift hydraulic pressure, which is controlled to be lower than a modulator hydraulic pressure for engaging the clutch mechanism.

When the shift operation is detected (Step S7: YES), the limiter 76 restricts a gear shift request (Step S8). The limiter 76 may halt the gear shift request. That is, when the lever position sensor 48 supplies a signal indicating the lever operation position Psh for the D position, the limiter 76 may reject the signal, or may disable the signal after receiving the signal. Thus, the ECU 30 keeps the P range of the automatic transmission 14 by halting selection of the D range. Even if the driver depresses the accelerator pedal, the clutch mechanism is disengaged, and the transmission of the power of the engine 12 to the automatic transmission 14 is interrupted. Accordingly, the engine stall is avoided.

When the process of Step S8 is completed, the limiter 76 then calculates a power change amount Xc (Step S9). The power change amount Xc is an amount of change in the engine power X, indicating a change in the condition of the engine 12. For example, the limiter 76 periodically measures the temperature of at least one of the water and the lubricating oil, and calculates the power change amount Xc based on a gradient of the measured temperature (specifically, a temperature increase). The limiter 76 may estimate a heat generation amount of the engine 12 based on, for example, the number of output revolutions Ne of the engine 12, and calculate the power change amount Xc based on the estimated heat generation amount. The limiter 76 may periodically measure the coolant temperature, the oil temperature of the lubricating oil, and the number of output revolutions Ne, determine the engine torque based on the engine torque map, and calculate, as the power change amount Xc, a difference in the engine power X periodically calculated based on the determined engine torque. As the oil temperature of the lubricating oil increases, the viscosity of the lubricating oil decreases, and the load torque of the engine 12 decreases. Thus, the engine power X increases, and the possibility of the engine stall decreases.

When the process of Step S9 is completed, the limiter 76 calculates a waiting time T1 (Step S10). More specifically, the limiter 76 calculates a time required for the generable power α to exceed the D-range load Y2 as the waiting time T1 for the driver based on the power change amount Xc. When the power change amount Xc can be calculated, the time required for the generable power α to exceed the D-range load Y2 can be estimated, and the estimated time can be calculated as the waiting time T1 for the driver.

Figure 5A:
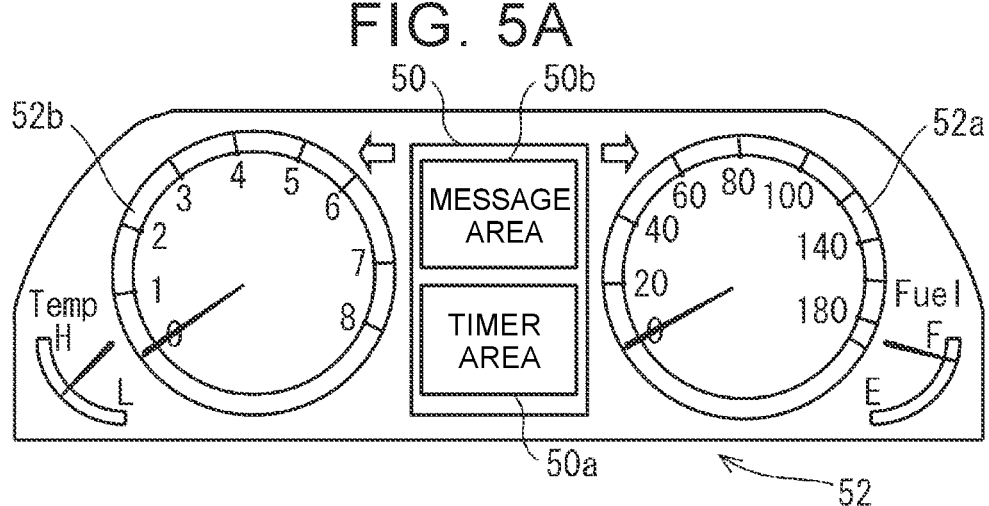
FIG. 5A illustrates an example of an instrument panel.

When the process of Step S10 is completed, the limiter 76 causes the indicator 50 to show a graphical object 51 that depends on the waiting time T1 (Step S11). More specifically, the limiter 76 generates a second indication signal for the graphical object 51 that changes at least one of its shape, pattern, and color depending on an elapse of the waiting time T1, and outputs the generated second indication signal to the indicator 50 via the outputter 92. As illustrated in FIG. 5A, the indicator 50 is arranged on the instrument panel 52. For example, the indicator 50 can be arranged between a speedometer 52a and a tachometer 52b provided on the instrument panel 52. The arrangement position of the indicator 50 is not particularly limited.

Figure 5B:
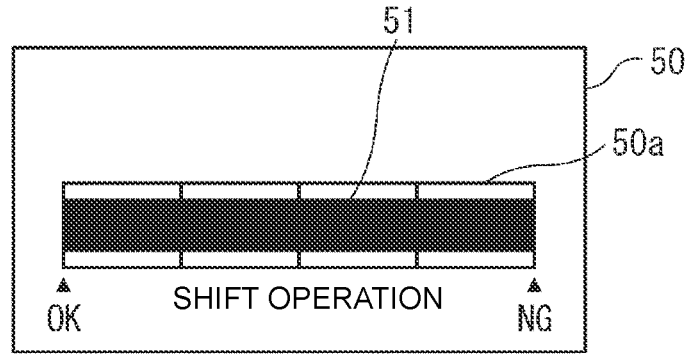
FIG. 5B is a diagram illustrating an example of a change in an indication content on an indicator.
Figure 5C:
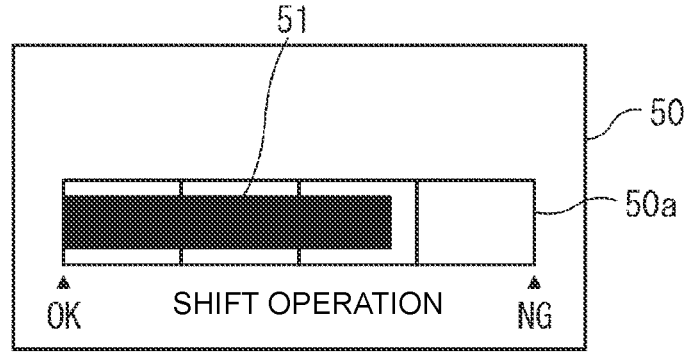
FIG. 5C is a diagram illustrating the example of the change in the indication content on the indicator.

The indicator 50 includes a timer area 50a. As illustrated in FIG. 5B and FIG. 5C, the graphical object 51 that changes its form depending on the elapse of the waiting time T1 is shown in the timer area 50a. In this embodiment, the length of the rectangular graphical object 51 decreases depending on the elapse of the waiting time T1. The graphical object 51 may have a circular shape. At least one of the pattern and the color of the graphical object may be changed while changing its shape. Alternatively, at least one of the pattern and the color of the graphical object may be changed without changing its shape. When the driver views the graphical object 51, the driver can grasp how much the waiting time T1 elapses.

Figure 5D:
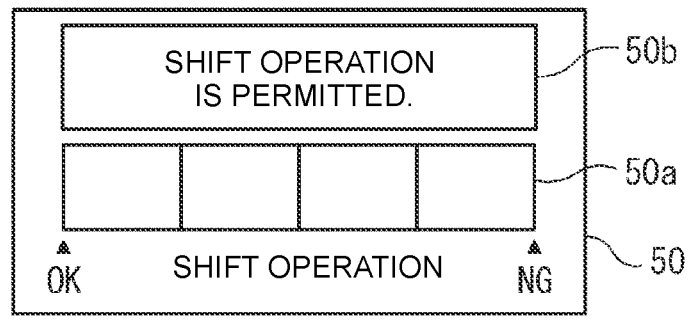
FIG. 5D is a diagram illustrating the example of the change in the indication content on the indicator.

The indicator 50 further includes a message area 50b. A notification message for the driver is shown in the message area 50b. For example, As illustrated in FIG. 5D, when the waiting time T1 reaches zero and the graphical object 51 disappears from the timer area 50a, a predetermined message is shown in the message area 50b. The predetermined message may notify the driver that the shift operation is permitted, or that the possibility of the engine stall is eliminated. Thus, the driver returns the shift lever 46 from the D position to the P position, and manually shifts the shift lever 46 to the D position again. The driver may return the shift lever 46 from the D position to the P position at a timing when the rejection sound described later is output.

When the process of Step S11 is completed, the limiter 76 causes the loudspeaker 60 to output the rejection sound (Step S12). More specifically, the limiter 76 generates a second output signal for outputting the rejection sound, and outputs the generated second output signal to the loudspeaker 60 via the outputter 92. By receiving the second output signal, the loudspeaker 60 outputs the rejection sound. With the rejection sound, the driver can recognize that the gear shift request from the P range to the D range is restricted. The driver can understand that the reason why the vehicle 10 does not travel forward despite the depression of the accelerator pedal is not trouble in the vehicle 10. When the process of Step S12 is completed, the limiter 76 terminates the processes. The order of the process of Step S12 and the process of Step S11 may be changed.

According to this embodiment, the ECU 30 controls the vehicle 10 including the engine 12 and the automatic transmission 14. The ECU 30 includes the estimator 73, the third calculator 74, the determiner 75, and the limiter 76. The estimator 73 estimates the generable power α of the engine 12 based on the condition of the engine 12 and the condition of the automatic transmission 14 in the non-driving range.

The third calculator 74 calculates the D-range load Y2 on the automatic transmission 14 in the D range based on the condition of the automatic transmission 14 in the driving range. The determiner 75 determines whether the difference between the generable power α and the D-range load Y2 is equal to or smaller than the predetermined threshold by which the engine stall is identifiable. When the difference is equal to or smaller than the predetermined threshold, the limiter 76 restricts the gear shift request from the P range to the D range. Thus, it is possible to suppress the engine stall when the shift change operation is performed from the P range to the D range at least in a low-temperature environment. In particular, the engine stall can be suppressed even in a case of an upland that is high in elevation where the power of the engine 12 decreases and the possibility of the engine stall increases due to a decrease in the atmospheric pressure.

In the embodiment described above, the load torque that depends on the viscosity of the lubricating oil is described as an example of the load torque acting on the output torque of the engine 12. The load acting on the power of the engine 12 is not limited to the load that depends on the viscosity of the lubricating oil. For example, a load torque caused by an auxiliary device 13 provided in association with the engine 12 may be employed. Examples of the auxiliary device 13 include a starter, a self-starter, an alternator, a water pump, and a compressor of an air conditioner. When the generable power α is estimated by employing the load torque of the auxiliary device 13 that depends on the number of output revolutions of the engine 12 together with the load that depends on the viscosity of the lubricating oil, the accuracy of the generable power α can be increased, and the engine stall can be suppressed accurately.

Although the preferred embodiment of the present disclosure is described above in detail, the present disclosure is not limited to the specific embodiment, and various modifications and changes may be made within the scope of the gist of the present disclosure described in the claims. For example, an intake pressure sensor may be employed, and the atmospheric pressure may be estimated based on an intake pressure. Regarding the number of input revolutions, the number of output revolutions may be employed. In the embodiment described above, various maps are employed. Predetermined calculation expressions may be employed in place of the maps to calculate the engine power X, the P-range load Y1, and the D-range load Y2.

What is claimed is:

1. A vehicle controller that controls a vehicle including an engine and an automatic transmission, the vehicle controller comprising an electronic control unit configured to:
   estimate power generable by the engine based on a condition of the engine and a condition of the automatic transmission in a non-driving range;
   calculate a load on the automatic transmission in a driving range based on a condition of the automatic transmission in the driving range;
   determine whether a difference between the power and the load is equal to or smaller than a predetermined threshold by which an engine stall is identifiable; and restrict a gear shift request from the non-driving range to the driving range when the difference is equal to or smaller than the predetermined threshold.

2. The vehicle controller according to claim 1, wherein the electronic control unit is configured to correct the power based on an atmospheric pressure.

3. The vehicle controller according to claim 1, wherein the electronic control unit is configured to estimate the power based also on a load caused by an auxiliary device of the engine.

4. The vehicle controller according to claim 1, wherein the electronic control unit is configured to, when the difference is equal to or smaller than the predetermined threshold:
   estimate a time required for the difference to exceed the predetermined threshold based on a change in the condition of the engine; and
   cause an indicator to show a graphical object that changes at least one of a shape, a pattern, and a color of the graphical object depending on an elapse of the estimated time.

5. The vehicle controller according to claim 1, wherein the electronic control unit is configured to, when the difference is equal to or smaller than the predetermined threshold, cause a loudspeaker to output a sound indicating that a shift change operation from the non-driving range to the driving range is restricted.

6. The vehicle controller according to claim 1, wherein the electronic control unit is configured to halt the gear shift request when the difference is equal to or smaller than the predetermined threshold.

7. A method of controlling a vehicle including an engine and an automatic transmission, the method comprising:
   estimating power generable by the engine based on a condition of the engine and a condition of the automatic transmission in a non-driving range;
   calculating a load on the automatic transmission in a driving range based on a condition of the automatic transmission in the driving range;
   determining whether a difference between the power and the load is equal to or smaller than a predetermined threshold by which an engine stall is identifiable; and
   restricting a gear shift request from the non-driving range to the driving range when the difference is equal to or smaller than the predetermined threshold.

* * * * *